G. F. FISHER.
TIRE BUILDING MACHINE.
APPLICATION FILED DEC. 31, 1915.
1,228,196.
Patented May 29, 1917.
3 SHEETS—SHEET 1.
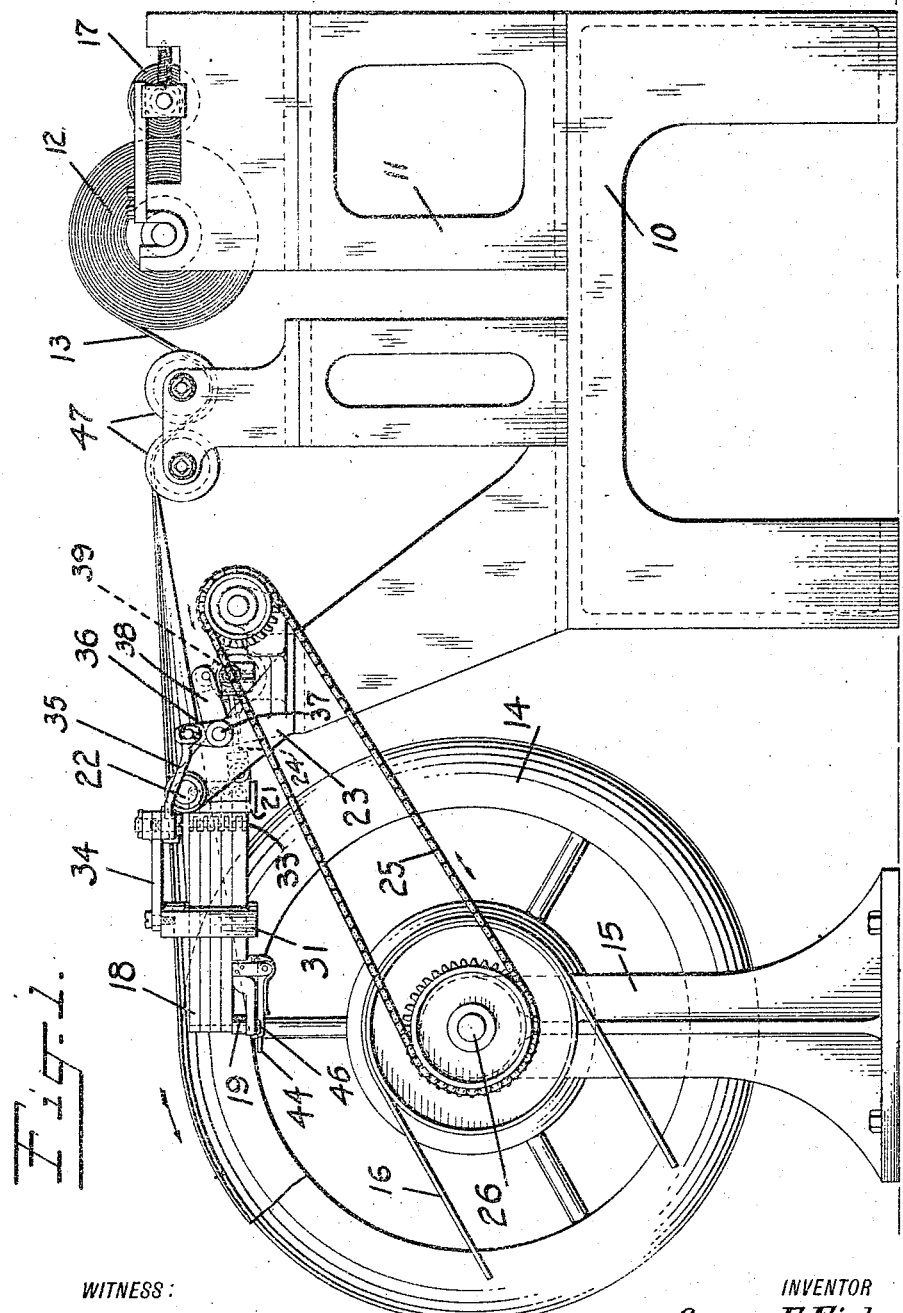
WITNESS:
INVENTOR
George F. Fisher,
BY
Ernest Hopkinson
HIS ATTORNEY

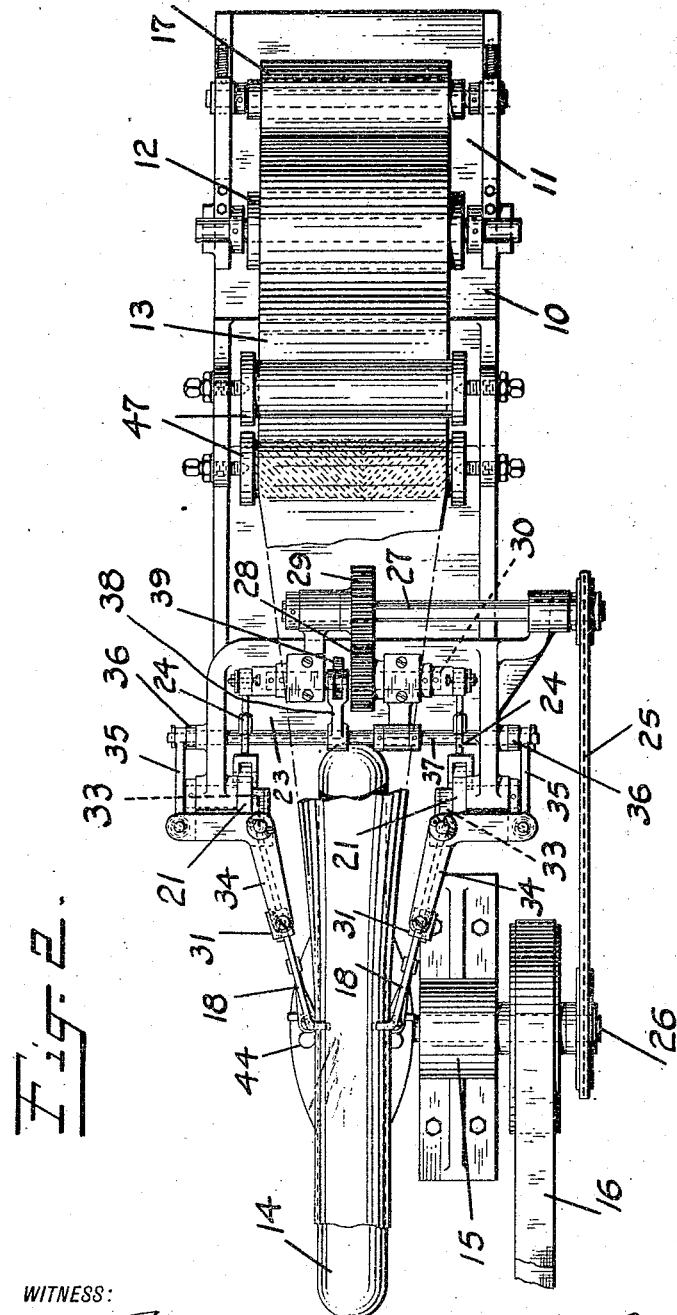

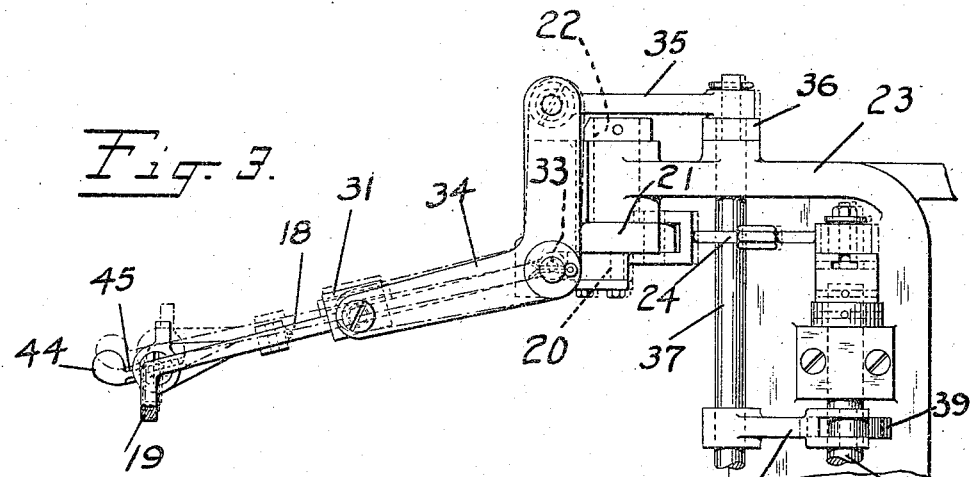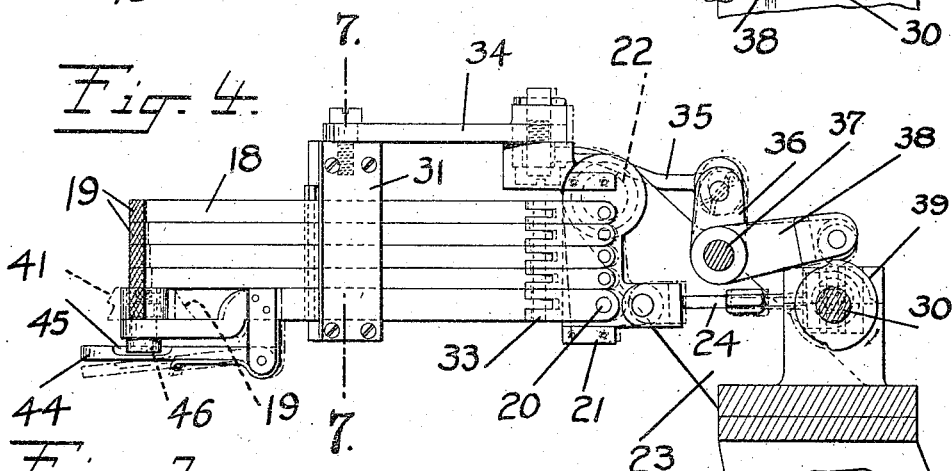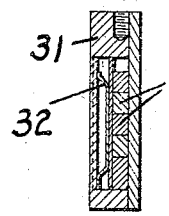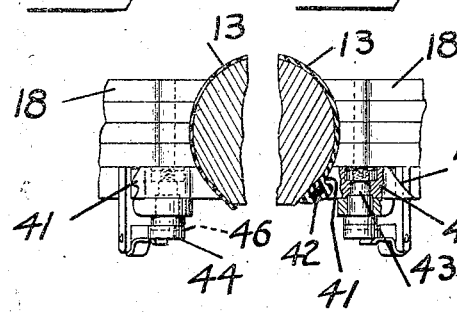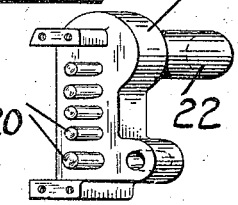

UNITED STATES PATENT OFFICE.

GEORGE F. FISHER, OF ROSELLE, NEW JERSEY, ASSIGNOR TO THE HARTFORD RUBBER WORKS COMPANY, A CORPORATION OF CONNECTICUT.

TIRE-BUILDING MACHINE.

1,228,196.     Specification of Letters Patent.     Patented May 29, 1917.

Application filed December 31, 1915. Serial No. 69,547.

*To all whom it may concern:*

Be it known that I, GEORGE F. FISHER, a citizen of the United States, residing at Roselle, county of Union, and State of New Jersey, have invented certain new and useful Improvements in Tire-Building Machines, of which the following is a full, clear, and exact description.

This invention relates to tire building machines, and has for an object to provide a simplified and improved device for positively and accurately pressing the tire material to partake of the configuration of the tire forming core.

It is important that the various plies of material upon the ring core be shaped to intimately partake of the configuration of the core. Usually rubber treated fabric cut on the bias is employed in the construction of tires, since this may be readily stretched radially of the core to foreshorten it at the margins to make it conform to the continually decreasing circumferences of the core as it approaches the inner edges of the core. Fabric cut on the straight, that is, fabric in which the warp threads are disposed parallel to the cut edges, has not been in general use due to the difficulty of properly foreshortening it to conform to the core as above described.

The present invention provides apparatus which facilitates the general use of either bias cut fabric or fabric cut on the straight, and to attain this end employs presser fingers which are positively reciprocated substantially tangentially to the core at respective ratios of speed relatively to corresponding portions on the surface of the core and serve to foreshorten and compact the excess material at the sides of the tire to conform to the configuration of the sides of the core.

The invention can be readily understood from the following description taken in connection with the accompanying drawing, in which—

Figure 1 is a side elevation of a tire building machine constructed in accordance with the invention;

Fig. 2 is a plan view of the parts shown in Fig. 1 with parts broken away;

Fig. 3 is a detail plan view showing the presser fingers in full lines in operative position and in dotted lines in released position;

Fig. 4 is a detail side elevation showing the presser fingers in full lines at one limit of stroke and in dotted lines at the opposite limit of stroke;

Fig. 5 is a fragmentary cross-sectional view showing the position of the presser fingers in laying the inner plies;

Fig. 6 is a detail cross-sectional view showing the position of the presser fingers in laying the outer plies;

Fig. 7 is a fragmentary cross-sectional view on the line 7—7, Fig. 4;

Fig. 8 is a detail perspective view of the rock arm upon which the presser fingers are carried.

Referring now to the drawings, in which like characters of reference designate similar parts, 10 designates a base upon which is mounted a frame 11 that supports the stock roll 12 from which rounds or plies of rubber treated fabric 13, either bias or on the straight, are supplied to a ring core 14. The core is revolubly mounted upon a standard 15 and is adapted as usual to be power driven as indicated at 16 or otherwise. During each single revolution of the core a round of fabric is drawn from the stock roll onto the core, the liner strip which separates the convolutions of the stock roll being simultaneously spooled upon a roll 17.

In the present embodiment of the invention, on each side of the core a series of presser fingers 18 is positioned to extend substantially tangentially to the core. The working faces 19 of the fingers are roughened to frictionally contact with the fabric, and conform to the contour of the core radially from near the tread portion of the core to near the bead portion of the core. The fingers are pivoted as shown at 20 upon a rock arm 21 which is pivoted as shown at 22 upon a support 23 and is rocked by an eccentric 24. A chain drive 25 connects the drive shaft 26 of the core with a shaft 27 which, through the instrumentality of meshing gears 28 and 29, drives the eccentric shaft 30. The fingers on both sides of the core are reciprocated simultaneously and substantially tangentially to the surface of the core by the above described mechanism.

Said mechanism reciprocates the fingers at a predetermined ratio of speed relatively to the surface speed of that portion of the core which passes underneath them, the speed of the fingers being sufficiently faster than the corresponding portion of the core to enable each finger to frictionally urge the fabric forward in the direction of rotation of the core and thus produce foreshortening of that portion of the fabric which passes underneath it.

Each successive finger is at a greater distance from the pivot 22 of the arm than, and consequently moves at a faster speed and has a greater length of stroke than, its preceding neighbor nearer the tread portion of the core. Therefore, the foreshortening action of the fingers will be least near the tread portion of the core, will be greatest near the bead portion of the core, and will be graduated between these extremes. As a result the sides of the fabric will be foreshortened at all points to conform accurately to the constantly decreasing diameters of the core from near the tread portion to near the bead portion.

Each series of fingers is carried as a unit in a respective frame 31, the fingers being yieldingly held against the side of the frame by a spring 32. Each finger has a joint 33 near its pivoted end which permits independent lateral movement of the finger against the pressure of the spring to conform to the contour of the fabric laid upon the core. The frame 31 is connected by a bell crank lever 34 which is connected by a rod 35 with a crank 36 on a rock shaft 37, the latter having a cam arm 38 which is operated by a cam 39 on the shaft 30. The cam is timed to move the frame 31 laterally to press the working ends of the fingers against the fabric just prior to the beginning of the forward stroke and permit the fingers feathering on the fabric during their return stroke.

The lowermost of the series of fingers 18 is provided with a tool 40 having an additional working face 41 adapted to conform to the contour of the bead 42 of the tire, the tool being mounted upon a pivot 43 to permit of either the working face 19 or the working face 41 being applied to the fabric. The tool is locked in either of its two operative positions by means of a spring pressed pivoted bar 44 having a fin 45 adapted to enter a corresponding groove 46 in the pivot of the tool.

In operation the end of the strip 13 of fabric is trained first between tensioning rollers 47, one of which is equipped with diverging ribs or other devices to remove longitudinal wrinkles from the strip. Thence it is passed underneath the working ends of the fingers 18 and is applied to the ring core to which it adheres. The machine is then started and during each revolution of the core a round of the fabric is drawn onto the core. The fingers reciprocate positively during rotation of the core and foreshorten the fabric to conform to the surface configuration of the core substantially at the moment it arrives thereat from the fabric supply. After the inner plies are laid, the machine is stopped, the beads are applied, and the corresponding faces of the tools 40 are turned to operate upon the fabric. The operation of the machine is then continued until the tire reaches its required dimensions.

I do not limit myself to the construction illustrated and described since various changes may be made within the scope of the appended claims. For instance, the working ends of the fingers may be disposed to extend in other directions than radially of the core. Again the fingers themselves may be reciprocated in other direction than substantially tangentially although the latter is preferable. I do not limit myself to the mechanism illustrated for reciprocating the fingers as equivalents may be employed. Nor do I limit myself to a positive drive from the ring core shaft as a separate source of power may be employed if desired. In fact, there is a wide latitude of variations in the construction, relative location of parts, timing of relative speeds, and so forth, that may be made without departing from the spirit or sacrificing any of the advantages of the invention.

When in the following claims I use the term "substantially tangentially", I mean the term to include circumferential, and diagonal directions other than radial with respect to the surface of the core. And when I use the term "presser finger", I mean the term to include any device having the function of exerting a pressure in the direction of the core upon tire material during the tire building operation.

Having thus described my invention what I desire to protect by Letters Patent is:

1. A tire building machine embodying a revoluble core for receiving material, and positively reciprocating presser fingers adapted to push the material in the direction of rotation of the core for shaping the material on the core.

2. A tire building machine embodying a revoluble core for receiving material, presser fingers adapted to contact with the material, and means for positively reciprocating the fingers substantially tangentially to the core.

3. A tire building machine embodying a revoluble core for receiving material, presser fingers adapted to frictionally contact with the material, and means for positively reciprocating each finger substantially tangentially to and at a predetermined ratio of speed relatively to a corresponding portion on the surface of the core.

4. A tire building machine embodying a revoluble core for receiving material, a series of presser fingers adapted to frictionally contact with the material from near the tread portion to near the bead portion of the core, and means for positively reciprocating each finger substantially tangentially to the core and at a different speed than its neighbor in the series.

5. A tire building machine embodying a revoluble core for receiving material, presser fingers adapted to frictionally contact with the material from near the tread portion to near the bead portion of the core, and means for positively reciprocating each finger substantially tangentially to the core and at a faster speed than its neighbor nearer the tread portion of the core.

6. A tire building machine embodying a revoluble core for receiving material, presser fingers adapted to frictionally contact with the material from near the tread portion to near the bead portion of the core, and means for reciprocating said fingers as a unit substantially tangentially of the core at different speeds from each other.

7. A tire building machine embodying a revoluble core for receiving material, a series of presser fingers adapted to frictionally contact with the material, an arm carrying said fingers, and means for rocking said arm to reciprocate said fingers substantially tangentially to the core.

8. A tire building machine embodying a revoluble core for receiving material, presser fingers adapted to frictionally contact with the material, means for positively reciprocating each finger substantially tangentially to the core at a predetermined ratio of speed relatively to a corresponding portion on the surface of the core, and means adapted to move said fingers laterally toward the core prior to the stroke of the fingers in the direction of rotation of the core.

9. A tire building machine embodying a revoluble core for receiving material, a series of presser fingers disposed laterally of the core, an arm carrying said fingers, means for rocking said arm to reciprocate said fingers substantially tangentially of the core, and means for moving said arm to press the fingers into tight contact with the material and release said fingers from such contact.

10. A tire building machine embodying a revoluble core for receiving material, separate yielding presser fingers adapted to contact with the material and conform to the configuration of the core radially, and means for reciprocating each finger substantially tangentially to the core at a predetermined ratio of speed relatively to a corresponding portion on the surface of the core.

Signed at New York, New York, this 30th day of December, 1915.

GEORGE F. FISHER.